United States Patent [19]

Antanaitis, Jr. et al.

[11] Patent Number: 5,163,146
[45] Date of Patent: Nov. 10, 1992

[54] SYSTEM RESPONSIVE TO INTERRUPT LEVELS FOR CHANGING AND RESTORING CLOCK SPEED BY CHANGING AND RESTORING A REGISTER VALUE

[75] Inventors: Benjamin C. Antanaitis, Jr., Charlotte; Wiliam B. Emerson, Jr., Matthews; Joseph W. St. John, Concord, all of N.C.

[73] Assignee: International Business Machines Corporation, Armonk, N.Y.

[21] Appl. No.: 652,447

[22] Filed: Feb. 7, 1991

Related U.S. Application Data

[63] Continuation of Ser. No. 257,664, Oct. 14, 1988, abandoned.

[51] Int. Cl.⁵ .................................. G06F 1/04
[52] U.S. Cl. .......................... 395/550; 364/934.3; 364/DIG. 2; 364/DIG. 1; 364/270.3
[58] Field of Search ...................... 395/550, 800

[56] References Cited

U.S. PATENT DOCUMENTS

| | | | |
|---|---|---|---|
| 3,842,405 | 10/1974 | Key et al. | 364/200 |
| 3,909,791 | 9/1975 | van den Berg | 340/172.5 |
| 4,004,283 | 1/1977 | Bennett et al. | 364/200 |
| 4,020,472 | 4/1977 | Bennett et al. | 364/200 |
| 4,050,096 | 9/1977 | Bennell et al. | 364/200 |
| 4,426,679 | 1/1984 | Yu et al. | 364/200 |
| 4,509,120 | 4/1985 | Daudelin | 364/200 |

Primary Examiner—David Y. Eng
Assistant Examiner—L. Donaghue
Attorney, Agent, or Firm—Karl O. Hesse

[57] ABSTRACT

A computer includes a main processing unit having arithmetic logic, memory address control, input/output address control, and execution control. The computer also has an operating system program which includes an interrupt handler module. A variable frequency clock oscillator is disclosed which is controlled by the operating system via the execution control unit of the main processing unit. Machine level instructions in the executing program change the clock speed whenever it is necessary to keep the computer in synchronism with one of its I/O adapters or to speed up the clock when slow speed circuits are not being utilized. Clock speed is changed by the interrupt handling module. Circuits and programs, which require longer cycle times to execute properly, are placed together on interrupt levels. For example, the machine check program requiring the slowest clock speed is assigned to interrupt level 0. I/O adapters using low-speed circuitry are assigned to interrupt levels 1, 2 and 3. High speed circuitry adapters are assigned to interrupt levels 4-7. Whenever an interrupt is generated, the machine language program serving the interrupt first changes the speed of the oscillator clock to that speed defined for the interrupt level on which the interrupt was received. When the interrupt has been serviced, the oscillator clock speed is restored to that speed of the program operating on the interrupt level which has just been interrupted.

2 Claims, 4 Drawing Sheets

SYSTEM RESPONSIVE TO INTERRUPT LEVELS FOR CHANGING AND RESTORING CLOCK SPEED BY CHANGING AND RESTORING A REGISTER VALUE

This is a continuation of co-pending application Ser. No. 257,664, filed on Oct. 14, 1988, now abandoned.

BACKGROUND OF THE INVENTION

1. Field of the Invention

This invention relates to computers, and more particularly to a control system and its method of operation for controlling the execution speed of a computer to permit it to operate with circuits having binary switching speeds slower than the computer circuit switching speed.

2. Description of Related Art

Variable cycle time microcomputers are known in the prior art. U.S. Pat. No. 4,509,120 shows a device for use with a microcomputer. The device is arranged with a parameter latch register for storing a binary value representing a desired access cycle delay. The delay is accomplished by forcing the microprocessor to the not ready state, thereby providing additional time for a device to respond to a write or read command. The parameter latch register is adapted to receive the binary value, either during manufacture or during the execution of instructions.

Likewise, U.S. Pat. No. 4,050,096 provides pulse expansion for microprocessor systems with slow memory. Logic circuitry expands the clock pulse which is applied to the microprocessor chip whenever a memory location is addressed which has a longer access time than is consistent with the width of the pulse ordinarily supplied to the microprocessor. Also, it is known to operate at different sampling rates when communicating over different communication lines U.S Pat. No. 3,909,971 shows such a system.

SUMMARY OF THE INVENTION

The system of the preferred embodiment of the invention uses interrupt levels to control the clock speed of a computer so as to permit it to operate synchronously with circuits not capable of operating at the maximum computer speed. For example, circuit cards which have been designed to operate with personal computers at 4 megahertz will not operate at the 10 or 20 megahertz clock rate of later generation computers. By use of this invention, the clock speed of the newer computer need not be permanently reduced to the speed of the slowest circuit card. The interrupt levels used to control the clock speed may be implemented in hardware or may be programs which execute logical decisions based upon the identity of the interrupting entity. This interrupting entity may be an input/output device adapter, a co-processor or other device, as well as a program executing in the computer. One example of a situation where it is desirable to execute a program at less than the maximum computer speed is when an error recovery program is executing. Since the error may have been caused by computer circuits operating at high speed, execution at a slower speed provides for more reliable computer error diagnosis.

An advantageous effect of this invention is that it permits the computer to operate compatibly with circuits that require longer cycle times due to semiconductor technology or circuit comlexity while at the same time permitting the computer to operate at maximum speed when the particular circuits are not involved in operation of the computer.

It is a further advantage of the invention that such circuits requiring longer cycle times need not be changed in any way to be compatible with the computer of the invention.

Another advantage is that the device driver programs which serve these slower speed I/O adapters may also be used with the invention without change.

Furthermore, these device drivers may even serve both low and high speed I/O adapters in the computer of the invention. This is advantageous, for example, if the computer has a diskette I/O adapter with circuits designed to run at 200 nanosecond cycle times and also has a hard disk drive adapter designed to meet the same software interface but having circuits that can operate at 100 nanosecond cycles.

These and other advantages of the invention are accomplished by placing each of the different speed adapters on different interrupt levels in the computer of the invention. The interrupt handler changes the speed of the computer to match the speed of the interrupting adapter prior to passing control to the device driver program.

PREFERRED EMBODIMENT OF THE INVENTION

Figure 1:
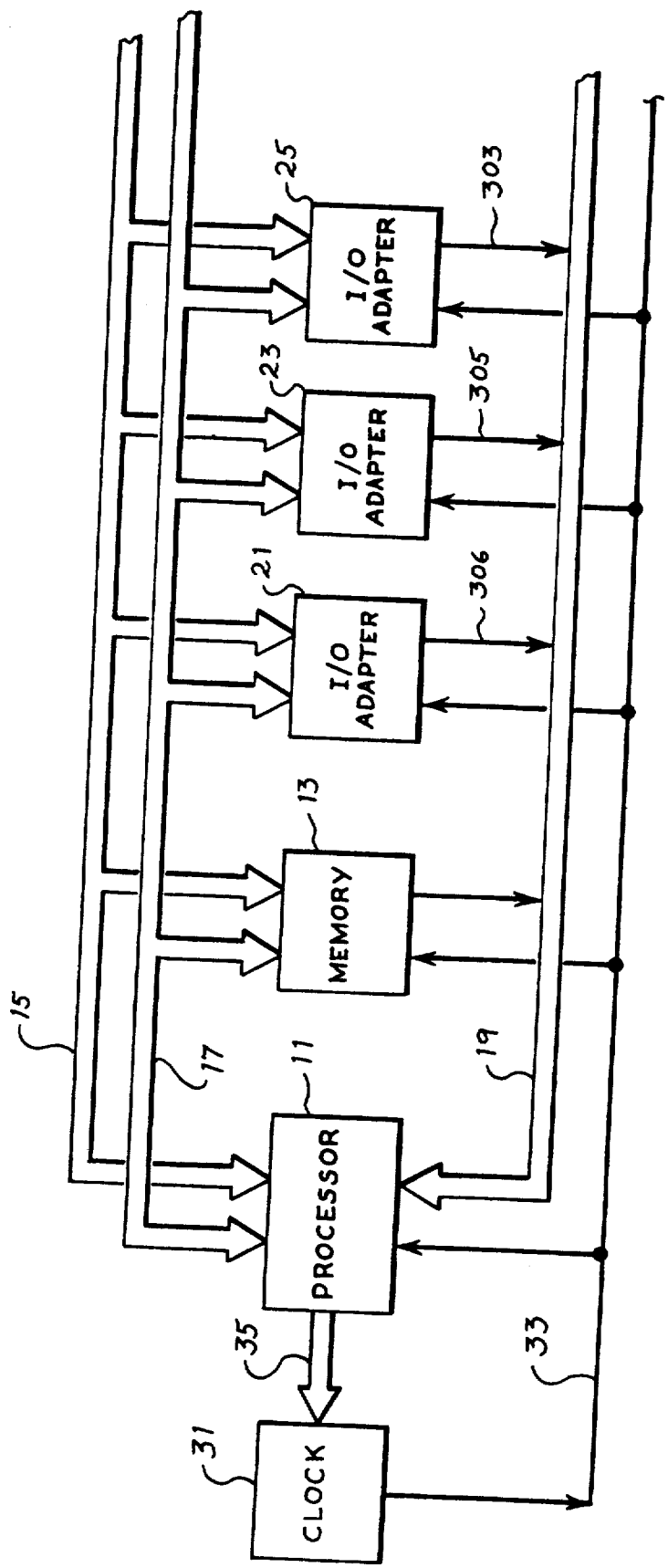
FIG. 1 shows a system block diagram of a computer using the invention.

FIG. 1 shows the organization of the computer hardware in block diagram form. A conventional computer processor, which includes the arithmetic logic unit and address and execution control units, is shown in block 11. The processor 11 provides addresses to, and data to and from, memory 13 on buses 15 and 17. Connected in parallel with memory 13 are a plurality of I/O adapters 21, 23 and 25. These adapters indicate to processor 11 when service is required by placing a signal on one of the wires of interrupt request bus 19. All of these circuits 11, 13, and 21-25 are kept in synchronism by a system clock 31 which provides a train of clock pulses on output line 33. The frequency of the output pulses provided on line 33 is controlled by a data word that has been transferred from processor 11 to system clock 31 over clock control line 35. In this example, adapters 21 and 23 can operate at 100 nanosecond clock cycles, but adapter 25 requires 200 nanosecond cycles in order to properly receive addressed commands from processor 11, and to send data and status to processor 11.

Interrupt request bus 19 has 8 separate wires in this example of 0-7 interrupts. Each wire is connected through a resistor to a voltage source. An interrupt request is generated by the requesting I/O adapter by connecting one of the interrupt request wires to ground level or 0 volts. This polarity of interrupt request signal makes it possible for multiple I/O adapters to share the same interrupt level. When sharing an interrupt level, the output signals are driven with an open collector line driver. The wires of interrupt request bus 19 are voltage level sensitive, rather than responding to the rising or falling edge of a pulse. Further detailed explanation of the operation of interrupts appears on pages 2-63, 64, 65 and 3-29, 30 in the IBM Personal System/2 (PM) Model 80 Technical Reference Manual, copyright International Business Machines Corporation, 1987.

Each of the input/output adapters 21, 23, 25 is implemented either in hard-wired logic circuits or as a microprogrammed microprocessor with its own oscillator and clock to operate at its own frequency. The logic circuits or microprocessor stores binary data in various registers, including the status register, and moves binary data to and from a data register, all at its own clock speed. This clock speed may be significantly slower than the clock speed at which processor 11 is capable of operating. The system clock control line 35 provides the synchronizing signal to each I/O adapter circuit so that the adapter might be aware of when data placed in its data register by processor 11 is valid and, alternately, when processor 11 expects data in the data register of an adapter to be valid for reading. Such input/output adapter circuits have been in use for some time. An example of such an input/output adapter appears in U.S. Pat. No. 4,006,465, the teachings of which are hereby incorporated by reference. The adapter disclosed in this patent connects a communication loop to a processor, using a microprocessor of its own having an arithmetic logic unit, read-only memory, etc.

Figure 2:
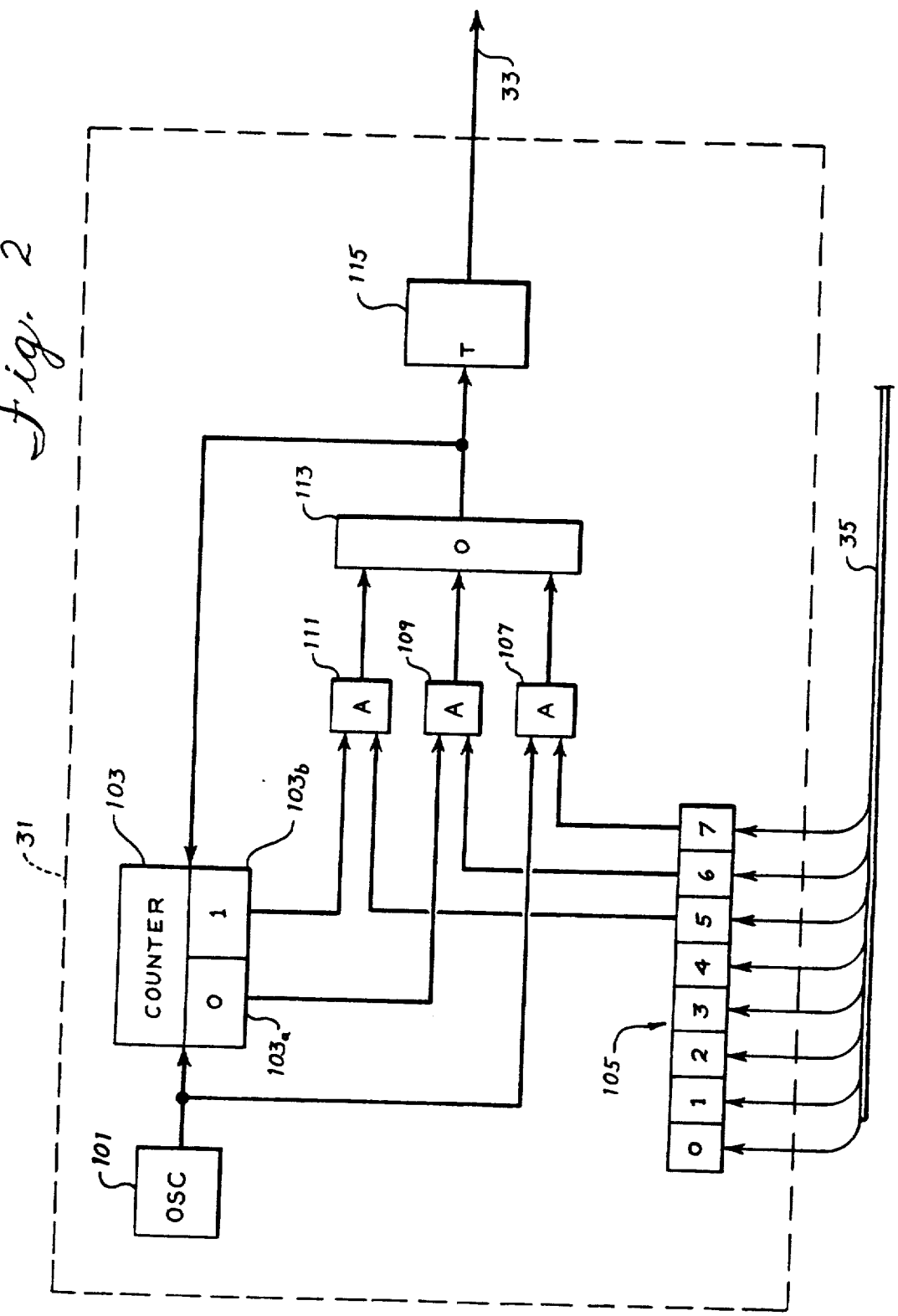
FIG. 2 is an example system clock used with the invention.

FIG. 2 shows an example of a system clock, shown as block 31 of FIG. 1. An oscillator 101 operates at a relatively high frequency and drives a counter 103. The counter 103 is a binary counter. Each stage (103a and 103b) of computer 103 reduces the frequency by a factor of 2. For example, if oscillator 101 operates at 20 megacycles, it completes a full cycle every 50 nanoseconds. The output of oscillator 101 is directly applied to AND gate 107. The stage seven of register 105 is also connected to AND gate 107. If a binary 1 bit appears in stage seven of register 105, AND gate 107 provides an output to OR gate 113, which allows the output of oscillator 101 to be applied to the toggle input of flip-flop 115. Flip-flop 115 goes through a complete set and reset cycle each 100 nanoseconds. The output of flip-flop 115 is the main clock applied to the processor 11, memory 13, and adapters 21, 23 and 25. Processor 11 further counts down this 100 nanosecond clock cycle to provide the various clock phases needed by processor 11. Each clock phase, in many cases, is also of 100 nanosecond duration. In the event that a 400 nanosecond duration is needed by processor 11 in order to serve device adapter 25, for example, a binary one bit is stored in stage five of register 105 and a binary zero in stages six and seven. Stage one (103b) of counter 103 is connected to AND gate 111. Stage five of register 105, also connected to AND gate 111, determines when the twice-divided oscillator frequency is to be gated through OR gate 113 to the toggle input of flip-flop 115. Since counter 103 stage zero (103a) operates at one-half the oscillator frequency, and stage one (103b) operates at one-fourth the oscillator frequency, flip-flop 115 is set every 400 nanoseconds and reset again 200 nanoseconds later. In this way the flip-flop 115 provides a series of cycles of 400 nanosecond duration to computer 11 and adapters 21, 23, and 25. Although the circuit of FIG. 2 works well with the invention, more sophisticated known circuits (e.g., involving phase locked loops and other features) provide overall system improvements in appropriate situations. For purposes of practicing the invention, however, this circuit at FIG. 2 avoids unrelated complexity inherent in such more sophisticated clock systems.

Figure 3:
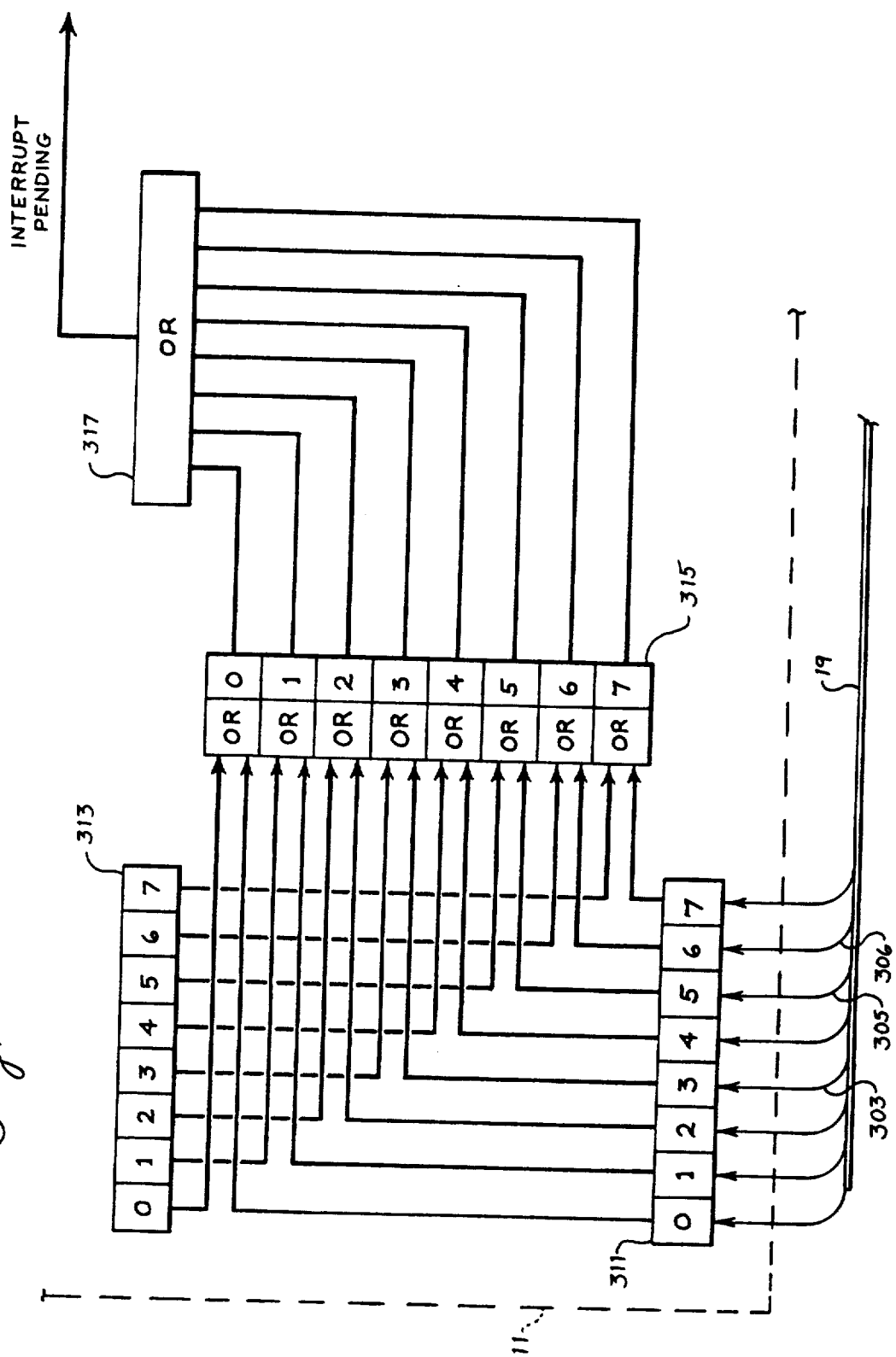
FIG. 3 shows the detailed connections of interrupt request lines with processor 11.

FIG. 3 shows the connections of interrupt request bus 19 in more detail. As shown in FIG. 3, interrupt request lines 305 and 306 are connected from I/O adapters 21 and 23 of FIG. 1 to stages five and six of hardware interrupt request register 311. Likewise, I/O adapter 25 in FIG. 1 is connected by interrupt request line 303 to stage three of interrupt request register 311. Other I/O adapters, not shown, may be connected to the same and other interrupt lines as needed to provide for proper prioritization of service and now, by use of this invention, proper clock speed. In addition to the interrupts stored in the hardware interrupt request register, register 313 also has 8 binary bits of storage which can be set by program instructions. Each stage, 0-7, of these two registers is individually ORed with its corresponding stage and the output connected to a corresponding stage of master interrupt request register 315. Each of the 8 stages of master interrupt request register 315 are logically ORed together by OR gate 317 to provide an interrupt request pending signal. Similar to register 313, register 315 is accessible by machine level program instructions, in this case, for reading the binary bit pattern stored in register 315. The interrupt handler program responds to the interrupt request pending signal to read the contents of register 315 and determine which interrupt will be served first. Usually, a sequence of priority from 0-7, with 0 being the highest priority and 7 being the lowest priority, is chosen. In this case, the interrupt handler program would respond to the binary bit stored in register 315 having the highest priority.

Figure 4:
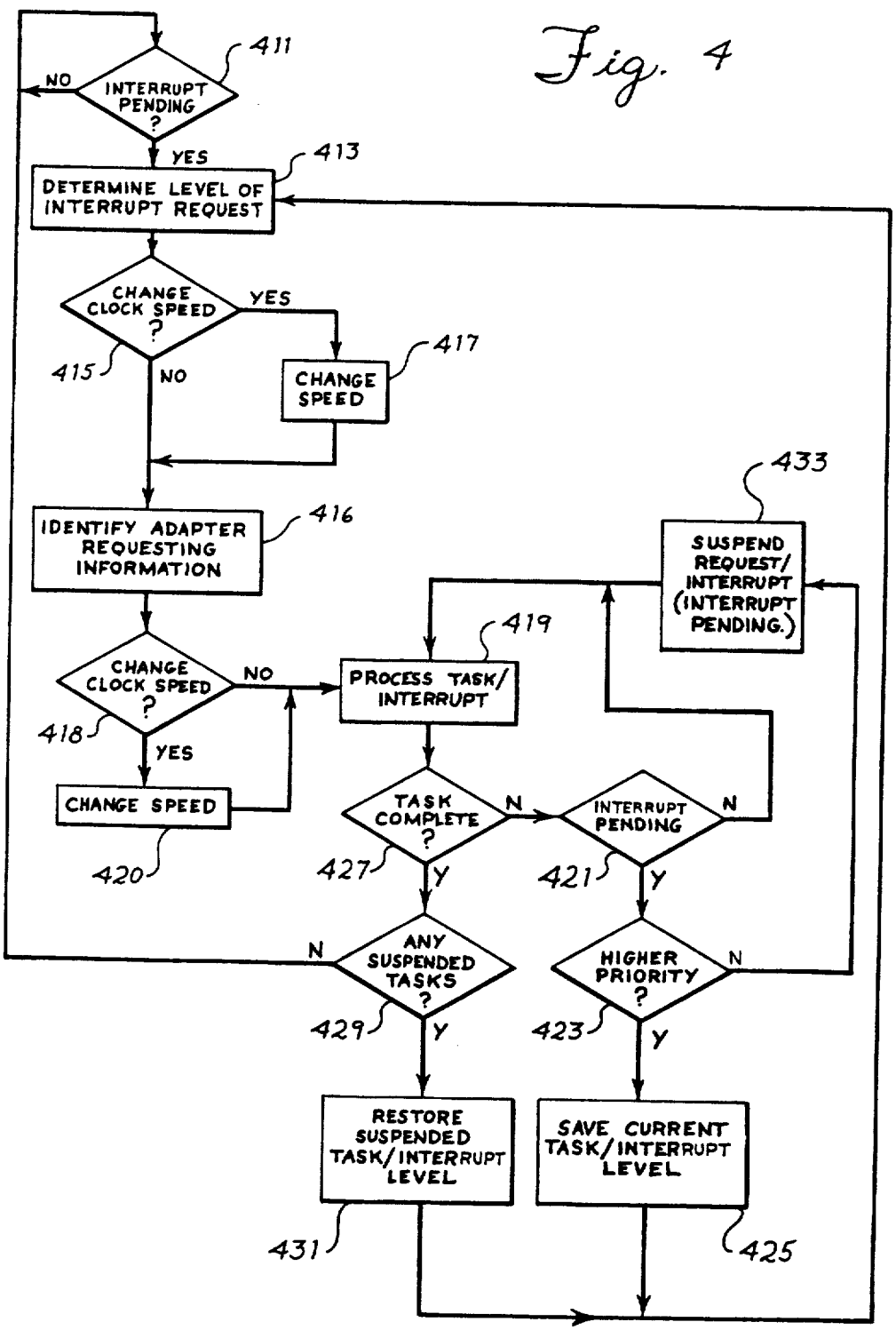
FIG. 4 is a flow diagram of the invention in operation.

The operation of interrupt request and service, using the invention, can better be understood by referring to FIG. 4 which is a flow diagram of the operation of the invention. In this example, I/O adapters using low-speed circuitry are assigned to interrupt levels 1, 2 and 3. High speed circuitry adapters which operate at the minimum 100 nanosecond clock cycle duration are assigned to interrupt levels 4-7.

Decision block 411 responds to the output of OR gate 317 in FIG. 3 to advise the programs running in processor 11 that an interrupt is pending. The interrupt handler program then determines at block 413 which level interrupt has been received by reading the content of register 315. Having determined the interrupt level of the interrupt request which has been received, the interrupt handling program jumps to that shown in Table I for interrupt levels 1-7 and that shown in Table II for interrupt level 0.

TABLE I

| CLIHENT | TI | X9,X'70' | If this is not level 1, 2,or 3 |
|---|---|---|---|
| | JZ | SA1RDIO | skip engine speed modification |
| | DISABLE | | disallow level interrupts |
| | IFON | NOWSLO,SA1KDO1 | ? engine speed has been reduced |
| | SETON | NOWSLO | no, indicate that it now has |
| | OI | X7,X'40' | and it was changed on this level |
| | KDO | 1 | change engine speed |
| | KDO | 2 | to CPU speed 2 (200NS cycle time) |

TABLE I-continued

| SA1KDO1 | ENABLE | | Allow level interrupts |
|---|---|---|---|
| SA1RDIO | EQU * | | |
| . | | | |
| . | | | |
| CLIHEXIT | TI | X7,X'40' | If speed not changed at this level, |
| | JZ | SA1KDO2 | exit without modifying engine speed |
| | NI | X7,X'BF' | else, clear control flag for this level |
| | KDO | 1 | change engine speed |
| | KDO | 2 | to CPU speed 3 (100NS cycle time) |
| | SETOFF | NOWSLO | clear speed modified flag |
| SA1KDO2 | EQU | * | enable to leave this level |

TABLE II

| LVL0ENT | KDO | 1 | Change engine speed |
|---|---|---|---|
| | KDO | 2 | to CPU speed 2 (200NS cycle time) |
| | KDO | 1 | Change engine speed |
| | KDO | 4 | to CPU speed 1 (400NS cycle time) |
| . | | | |
| . | | | |
| LVL0EXIT | TI | X4,X'04' | ? Previous level is 4, 5, 6 or 7 |
| | JZ | SM1KDO5 | jump no, handle levels 1, 2, 3 |
| | KDO | 1 | Change engine speed |
| | KDO | 1 | to CPU speed 3 (reset to 100NS speed) |
| | J | SM1KDO51 | |
| SM1KDO5 | KDO | 1 | Change engine speed |
| | KDO | 2 | to CPU speed 2 (reset to 200NS speed) |
| SM1KDO51 | EQU | * | Enable master mask to leave level |

Referring, then, to Table I, let us assume that an application program has been executing on level 7 when an interrupt is received on level 3 from adapter 25. The hardware of processor 11 suspends execution of the application program at the end of the currently executing intruction and passes control to the interrupt handling program in the operating system. The interrupt handler program then determines at block 413 whether an interrupt level zero has been received by utilizing the contents of register 315. If it is a level zero interrupt, control is passed to the instruction labeled LVL0ENT (level zero interrupt entry point) in Table II. If it is not a level zero interrupt, control falls through to the instruction shown in Table I at the line labeled CLIHENT (common level interrupt handler entry point). The first instruction is a test immediate to determine if the interrupt is not one of levels one, two, or three. If it were not one of these slower speed interrupt levels the clock speed would not have to be changed and the flow would jump (JZ SA1RDIO) around the clock speed change instructions. Since it was a level three interrupt, the flow falls through to disable further interrupts before the speed is actually changed. Then the flag NOWSLO is tested for yes condition to see if the clock has already been set to slow speed by a prior interrupt 1, 2, or 3. If yes, then branch (IFON NOWSLO,SA1KDO1) around the speed change instructions and re-enable interrupts in case a higher priority interrupt occurs.

Having accounted for all no action cases, the NOWSLO flag is set by the SETON NOWSLO instruction in Table I and OI X7,X'40' sets another flag in register seven to indicate that the clock speed was changed on this level. Then KDO 1 and KDO 2 instructions are executed to load a binary one in stage 6 and a binary zero in stage 7 of register 105 in FIG. 2. This causes flip-flop 115 to run at 5 megahertz to generate the 200 nanosecond cycles needed by the adapter 25. Thereafter, control is passed to the device driver program at block 419 which serves the needs of adapter 25. Recall that interrupts have been enabled so another interrupt from another adapter could occur. Such an interrupt can suspend this device driver program at block 421 in FIG. 4 to serve a higher priority adapter at blocks 423, 425, to block 413. If not interrupted, the device driver program task proceeds to completion at block 427. At block 429 control returns to the interrupt handler to restore the application program task that had been suspended to serve adapter 25, shown in FIG. 1. The interrupt handler must restore the computer to the speed of the suspended interrupt level before control is passed back to the suspended task. This restoration is shown in detail in the instructions at the end of Table I labeled CLIHEXIT.

First a test immediate instruction (TI) is executed to test for the flag in register 7 which indicates that the clock speed was changed when interrrupt level 3 was entered. If not changed, the program in Table I moves to jump on zero (JZ) to the exit point SA1KDO2. Otherwise the flags are cleared and the speed is changed back to the higher speed.

The instructions in Table II operate in similar fashion to change the speed of the computer to 400 nanosecond cycle time for level zero interrupts.

In another example of a computer configuration using the invention, several I/O adapters are connected to the computer on a same interrupt level, and some of these adapters may operate at slower speeds than the others are capable of operating. Such attachment on the same interrupt level can be necessary in order to satisfy both priority and speed demands made by the I/O device adapter being attached.

Improved performance can be obtained by restoring the computer execution speed to the speed of a faster I/O adapter after determining that the interrupting adapter circuits can operate at the faster speed. This is accomplished by maintaining a table of adapter speeds in a polling list along with other information about the adapter such as address, adapter type, pointer to the device driver program, and so forth.

The computer is changed to the speed of the slowest adapter circuits on the interrupt level in order to reliably poll the adapters for identification of the interrupting adapter at block 416 in FIG. 4. Once the interrupting adapter has been identified, the polling list speed entry for that adapter is used to match the computer execution speed at blocks 418 and 420 of FIG. 4, to that of the adapter while the device driver program is serving that adapter.

While the invention has been described with reference to a preferred embodiment which has been simplified in some non-critical respects in order to facilitate an understanding of the invention by separating it from other complex peripheral matters, it will be understood by those skilled in the art that various changes in implementation can be made without departing from the spirit and scope of the invention.

What is claimed is:

1. A computer having a processing unit, a memory, and a variable frequency clock, the frequency of said clock being controlled by a value stored in a register, said computer further comprising:

a plurality of first input/output adapter circuits, each of said first input/output adapter circuits being connected to said processing unit by a first interrupt line, said processing unit responding to a signal on said first interrupt line by executing first programmed instructions at a first clock frequency;

a plurality of second input/output adapter circuits, each of said second input/output adapter circuits being connected to said processing unit by a second interrupt line, said second input/output adapter circuits being capable of operating at a second clock frequency;

interrupt programmed instructions stored in said memory, said processing unit executing said interrupt programmed instructions in response to an interrupt signal from any one of said second input/output adapter circuits, said interrupt programmed instructions saving a copy of a first value stored in said register and then changing said first value in said register to a second value in order to change the frequency of said clock from said first clock frequency to said second clock frequency;

second programmed instructions stored in said memory, said processing unit executing said second programmed instructions for performing functions required by said any one of said second input/output adapter circuits;

return programmed instructions stored in said memory, said processing unit after executing said second programmed instructions, executing said return programmed instructions for retrieving said saved copy of said first value and changing said second value stored in said register back to said first value prior to returning to said previously executing first programmed instructions in order that said clock frequency be restored to said first clock frequency at which it was operating when said interrupt occurred.

2. A method of operating a computer having a variable frequency clock, controlled by a value stored in a register, comprising the steps of:

executing a program in said computer at a first clock frequency determined by a first interrupt level;

said computer responding to an interrupt from any one of a plurality of input/output adapter circuits connected to said computer on another interrupt level;

said computer saving an indication of a first value stored in said register;

said computer storing in said register, another value determined by the level on which said interrupt was received;

said computer performing functions required by said any one of said plurality of input/output adapter circuits;

said computer retrieving said saved indication of said first value;

said computer storing said saved first value into said register to restore said clock frequency to a frequency at which it was operating when said interrupt occurred; and said computer returning control to said previously executing program.

* * * * *